J. HAMAKER.
Sulky-Plow.
No. 198,017. Patented Dec. 11, 1877
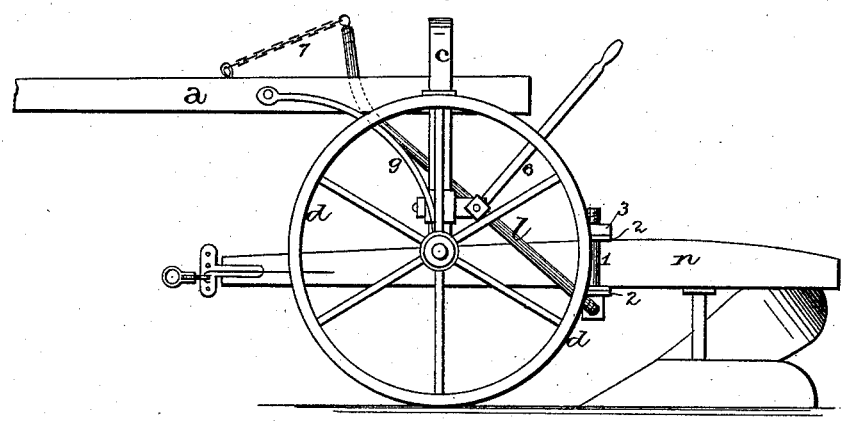
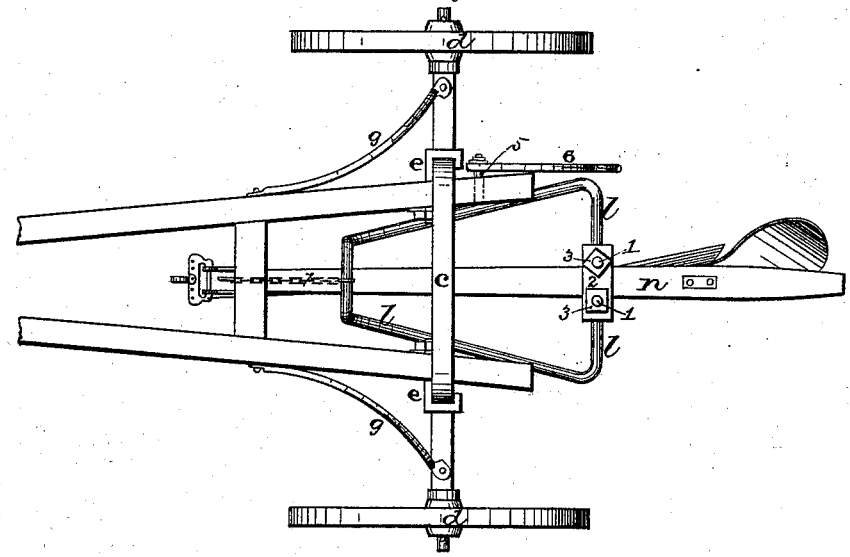
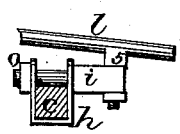
WITNESSES.
J. W. Garner
Will. H. Kerr
INVENTOR:
Jno. Hamaker,
per
F. A. Lehmann,
Atty.

UNITED STATES PATENT OFFICE.

JOHN HAMAKER, OF WHITE CLOUD, IOWA.

IMPROVEMENT IN SULKY-PLOWS.

Specification forming part of Letters Patent No. 198,017, dated December 11, 1877; application filed November 6, 1877.

*To all whom it may concern:*

Be it known that I, JOHN HAMAKER, of White Cloud, in the county of Mills and State of Iowa, have invented certain new and useful Improvements in Sulky-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in sulky-plows; and it consists in the arrangement and combination of parts that will be more fully described hereinafter, whereby the plow is readily and easily managed.

In the drawings, Figure 1 is a side elevation of my invention. Fig. 2 is a plan view of the same, and Fig. 3 a detail view.

$a$ represents the tongue; $c$, the axle, and $d$ the driving-wheels. The rear ends of the tongue are fastened to the inside of the vertical part of the bent axle by means of the screw-hooks $e$, and the tongue is braced in position by means of the rods or braces $g$.

Secured to the vertical parts of the axle are two U-shaped clasps, $h$, which have the journals or bearings $i$ passing through their two ends, and held rigidly in position by means of the nuts $o$, which are screwed upon their front ends.

It will be seen that by turning the nuts $o$ tightly against the sides of the clasps, the clasps are made to rigidly grasp the sides of the axle at the same time that the two bearings are tightened in position. By loosening the nuts the clamps can be adjusted up and down upon the axle, so as to regulate the distance the plow shall be raised and lowered.

The bail $l$, upon which the plow $n$ is pivoted by means of the screw-bolts 1, plates 2, and nuts 3, is provided with the two journals 5, which pass through the two bearings $i$, and upon which the bail rocks up and down. One of the journals 5 is made quite long, and to its outer end is applied an operating-lever, 6, by means of which the bail is rocked up and down. To the front end of the bail is fastened the chain 7, by means of which this end is prevented from dropping down too low or moving too far back. By shortening or lengthening the chain 7, the distance to which the plow shall be lowered toward the earth is easily regulated.

In raising the plow above the ground the lever is moved forward toward the axle, when the rear end of the bail will raise the plow upward until the front end of the bail strikes the top of the front end of the plow-beam, when the front end of the plow will be depressed to the full length of the chain, while the rear end of the plow will be raised upward.

Having thus described my invention, I claim—

The bail $l$, having the journals 5, in combination with the plow $n$, lever 6, and chain 7, substantially as described.

In testimony that I claim the foregoing I have hereunto set my hand this 22d day of October, 1877.

JOHN HAMAKER.

Witnesses:
WILLIAM NORRIS,
G. W. CURFMAN.